No. 684,527. Patented Oct. 15, 1901.
G. L. REENSTIERNA.
BRAKE MECHANISM FOR SELF PROPELLED VEHICLES.
(Application filed Oct. 8, 1900.)
(No Model.)
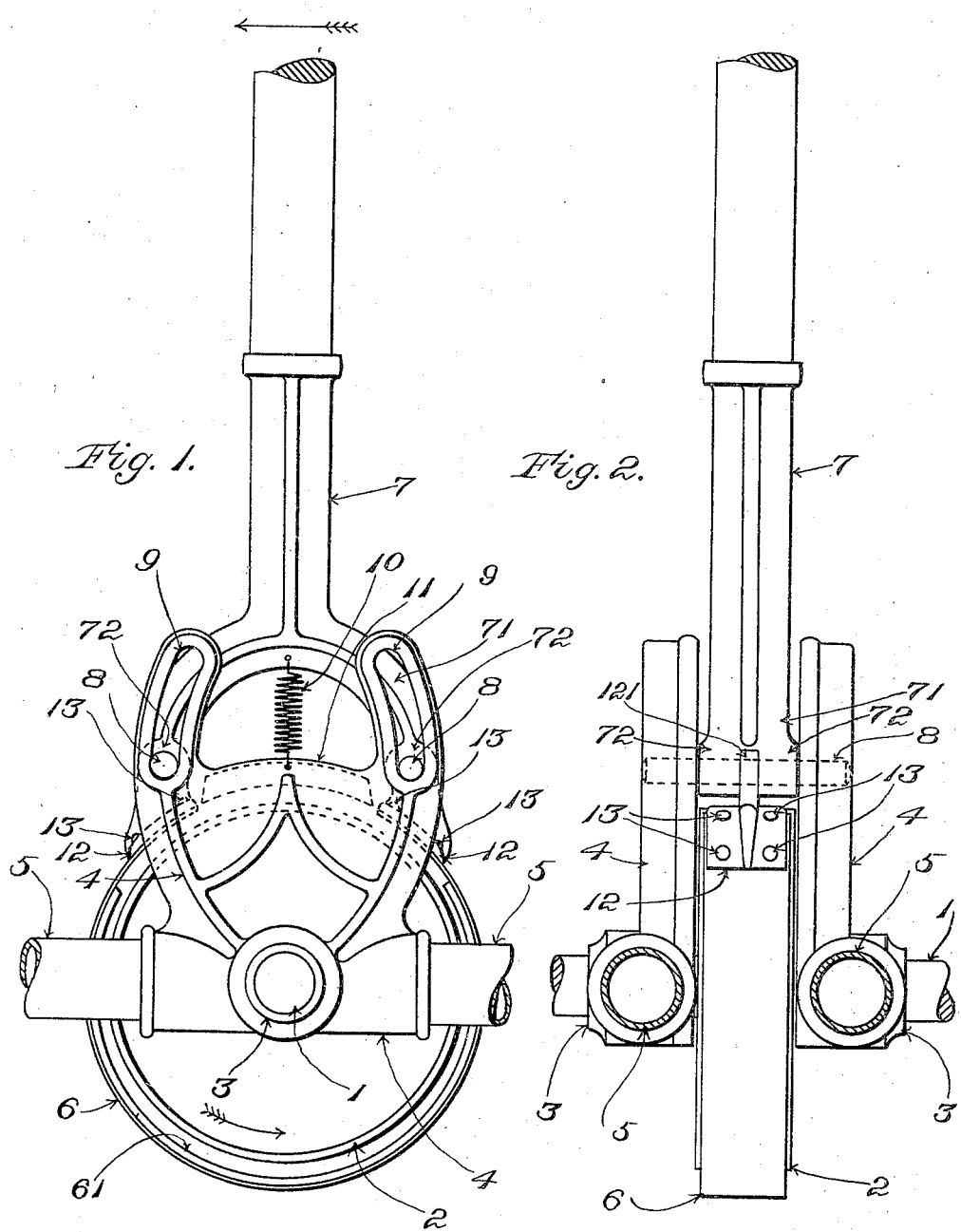
Witnesses:
Oscar F. Hill
Sadie M. Lowneto.
Inventor
Gustaf L. Reenstierna
by S Macleod Calver & Randall
Attorneys

UNITED STATES PATENT OFFICE.

GUSTAF L. REENSTIERNA, OF WINCHESTER, MASSACHUSETTS.

BRAKE MECHANISM FOR SELF-PROPELLED VEHICLES.

SPECIFICATION forming part of Letters Patent No. 684,527, dated October 15, 1901.

Application filed October 8, 1900. Serial No. 32,322. (No model.)

*To all whom it may concern:*

Be it known that I, GUSTAF L. REENSTIERNA, a citizen of the United States, residing at Winchester, in the county of Middlesex, State of Massachusetts, have invented a certain new and useful Improvement in Brake Mechanisms for Self-Propelled Vehicles, &c., of which the following is a specification, reference being had therein to the accompanying drawings.

My improved brake mechanism hereinafter described is fitted for use in various connections; but I have designed the same for use more especially in connection with what are known variously as "automobiles," "motor-vehicles," or "self-propelled" vehicles.

Some forms of brake mechanism which heretofore have been applied to automobiles have the drawback that although when applied they are operative to prevent undesired movement of the vehicle in one direction they are not effectual to prevent movement in the other direction under certain conditions. For instance, such brake mechanisms operate efficiently to check forward movement of a vehicle; but it sometimes happens that when a vehicle is ascending an upgrade and the brake mechanism is applied so as to check and arrest the advancing or forward movement of the vehicle the tendency of the vehicle to move backward down the grade under the influence of gravity is too great for the holding capacity of the brake mechanism, and in consequence the vehicle starts downhill. This results in inconvenience and accidents. Accidents are exceedingly likely to occur when the motive power gives out in ascending a hill unless the brake when applied acts efficiently to hold the vehicle from moving downhill. With the object in view of remedying the difficulty it has been proposed heretofore to apply duplicate brake mechanisms to a vehicle, the one thereof acting in a manner to check and prevent forward movement of the vehicle, and the other thereof acting to prevent retrograde movement thereof, the respective brake mechanisms being applied as necessitated by circumstances.

My invention consists in a duplex, double-acting, or reversible brake mechanism of simple, strong, and durable construction capable of being applied readily to a vehicle of the class aforesaid and adapted to be operated to prevent movement or counteract tendency to movement of the vehicle in either direction at will.

In the accompanying drawings I have illustrated a simple embodiment of the invention, which I will now proceed to describe.

The distinguishing and characteristic features of the invention are particularly pointed out and distinctly defined in the claims at the close of this specification.

In the drawings, Figure 1 is a view showing in side elevation the said embodiment of the invention. Fig. 2 shows the same elevation viewed from one side in Fig. 1.

Having reference to the drawings, 1 designates a suitable shaft, which in practice is mounted in the self-propelled or motor vehicle, it being either embodied in the driving-gear or running-gear of the vehicle or being operatively connected therewith in some suitable manner so as to turn in its bearings in correspondence with the movement of the vehicle. 2 is a brake-wheel mounted on the said shaft 1. I have shown bearings at 3 3, applied in connection with said shaft 1 at opposite sides of the said brake-wheel 2, the said bearings being provided in checks or side frames 4 4, which are connected with the tubular supports 5 5, forming part of a suitable framework pertaining to the vehicle in which the invention is employed.

6 designates a brake-band encircling the periphery of the brake-wheel 2 and in the present instance composed of a metal strap having a frictional lining 61, of leather or other suitable material, for the purpose, as usual. The said brake-band 6 is connected with the brake-lever 7, only the lower part of which is shown, and the construction and mode of connection of the parts are such, as I will now proceed to explain, that the brake-band 6 is drawn into contact with the periphery of the brake-wheel 2 with ample efficiency to produce the requisite braking effect in either direction in which the lever 7 is moved. The opposite ends of the brake-band 6 are connected with the brake-lever 7 at points separated from each other. Herein the said opposite ends of the brake-band 6 are shown connected with diverging arms 71 71 of the brake-lever 7. The brake-lever 7 is constructed for loose pivotal engagement with the side frames 4 4 at points oppositely located with reference to a plane passing through the axis of the shaft 1. Herein a pivotal pin 8, applied to each arm 71 of the brake-lever 7, has its ends arranged to project at opposite sides of the said arm, the said ends working in arc-shaped slots 9 9, which are formed in the upper portions of the castings 4 4. A tension-spring 10, connected with the brake-lever 7 at a point midway between the pins 8 8 and also connected with a cross piece or plate 11 (shown in dotted lines in Fig. 1) and attached to the side frames 4 4, draws upon the brake-lever with a tendency to hold both of the pins 8 8 seated against the lower ends of the slots 9 9. Each slot 9 is concentric with the opposite pin 8. In the present instance the pins 8 8 are utilized for connecting the opposite ends of the brake-band 6 with the opposite arms 71 71 of the brake-lever 7. Thus each end of the brake-band has a plate 12 attached thereto by means of rivets or other securing devices 13 13, the said plate 12 being provided with a lug 121, which enters between similar lugs 72 72 with which the corresponding arm of the brake-lever 7 is provided, the corresponding pin 8 being driven through holes in the three lugs, which holes register with one another when the lug 121 has been placed in proper apposition with the lugs 72 72.

It will now be perceived that the brake-lever 7 is furnished with duplicate fulcra, which latter are located at opposite sides of a plane passing through the axis of the shaft 1 and brake-wheel 2. The spring 10 operates with a tendency to hold the brake-lever 7 in the normal intermediate inoperative position thereof which it occupies in the drawings, the pivot-pins 8 8 being held pressed with equal force by the said spring against the seats, which are constituted by the lower or inner ends of the slots 9 9 in the side frames 4 4, and the brake-band being loose. If now the brake-lever is swung in either direction, it will turn upon one of the pins 8 8 as upon a fulcrum, while the other of the said pins will be caused to rise in its slots 9 9, which will draw the corresponding end of the brake-band 6, so as to tighten the said brake-band against the periphery of the brake-wheel 2. In practice the direction in which the brake-lever is swung will be determined by the direction in which at the moment of applying the brake the shaft 1 is rotating or tending to rotate. It will be perceived that it is possible in every case to apply the brake-band in such manner that the tendency of the same to move around in unison with the periphery of the brake-wheel 2 shall be resisted by fixed abutments. Thus in case the shaft 3 should be rotating in the direction which is indicated by the arrow near the same in Fig. 1 or in case it should be desired to counteract the tendency of the said shaft to rotate in the said direction the brake-lever 7 would be swung in the direction that is indicated by the arrow near the upper end of the same in the said figure. Movement of the said lever in this direction would cause the pivot-pin 8 at the left-hand side in Fig. 1 to take bearings against the seats or bearings which are constituted by the lower ends of the left-hand slots 9 in the side frames 4 4, while the right-hand pivot-pin 8 would rise in the right-hand slots 9, and the pull or drag upon the brake-band 6 resulting from its frictional engagement with the brake-wheel 2 would be resisted by the fixed abutments, which are constituted by the ends of the left-hand slots 9. In case of rotation or tendency to rotation of the shaft 3 in the reverse direction movement would require to be imparted to the brake-lever 7 in the direction which is opposite to that indicated by the arrow at the top of Fig. 1, and in this event the left-hand pivot-pin 8 would rise in the left-hand slots 9, while the right-hand pivot-pin would take firm bearing at the lower ends of the right-hand slots, the said lower ends constituting at this time the fixed abutments to withstand the drag or pull on the brake-band which is incident to the engagement of the brake-band with the periphery of the brake-wheel 2.

My invention enables the brake mechanism to act with equal efficiency in either direction of rotation of the shaft 1, since in either direction of rotation if the brake is applied properly the pull upon the brake-band is resisted by a fixed abutment.

I claim as my invention—

1. In combination, a brake-wheel, a brake-band encircling said brake-wheel, a reversibly-movable brake-lever having the ends of said brake-band connected therewith at opposite points, and also having opposite pivots, and the side frames having the opposite fulcra for said brake-lever and the arc-shaped slots in which said pivots work, substantially as described.

2. In combination, a brake-wheel, a brake-band encircling said brake-wheel, a reversibly-movable brake-lever having opposite pivots and also having the ends of said brake-band connected therewith at said pivots, and opposite slotted or open bearings for said pivots, substantially as described.

3. In combination, a brake-wheel, a brake-band encircling said brake-wheel, a reversibly-movable brake-lever having the ends of said brake-band connected therewith at opposite points, and also having opposite pivots, opposite bearings adapted to receive said pivots, and a spring acting with a tendency to hold both pivots to said bearings, substantially as described.

4. In combination, a brake-wheel, a brake-band encircling said brake-wheel, a reversibly-movable brake-lever having the ends of said brake-band connected therewith at opposite points, and also having opposite pivots, opposite slotted or open bearings for said pivots, and a spring acting with a tendency to hold both pivots to their seats in said bearings, substantially as described.

In testimony whereof I affix my signature in presence of two witnesses.

GUSTAF L. REENSTIERNA.

Witnesses:
 CHAS. F. RANDALL,
 SADIE M. LOWNSBRO.